June 2, 1959 — H. SCHNEIDER — 2,889,013
HYDRAULIC TURBO BRAKES
Filed Aug. 16, 1955 — 3 Sheets-Sheet 1
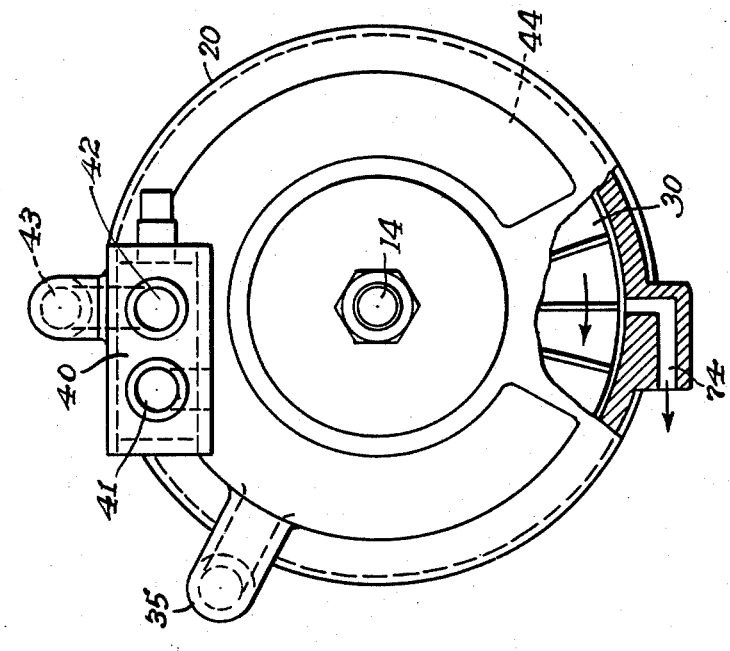
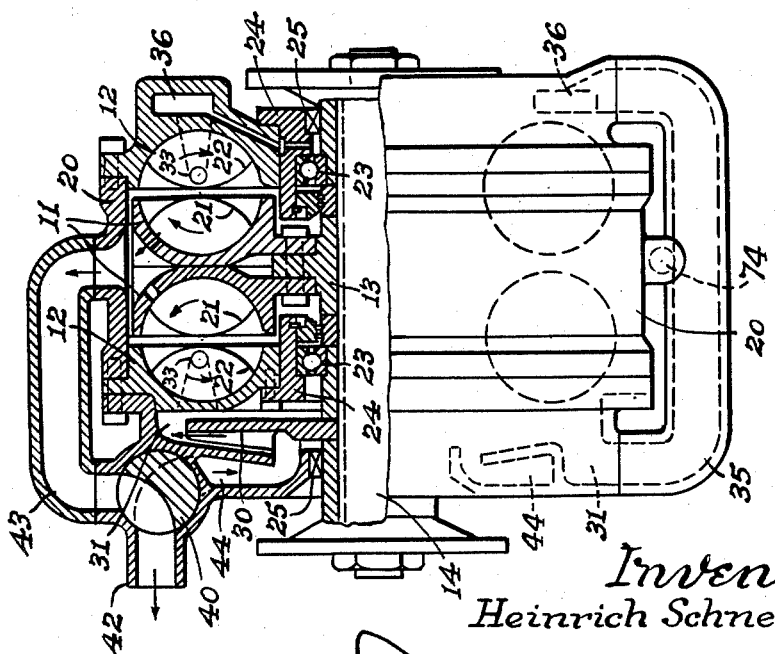
Inventor
Heinrich Schneider

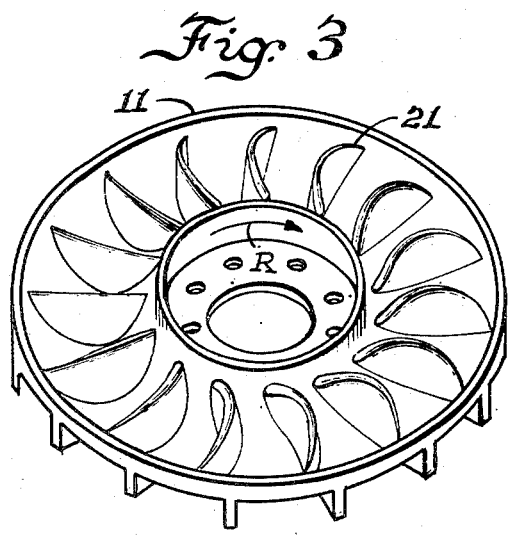
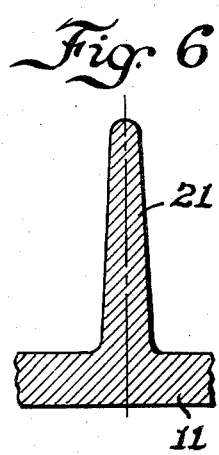
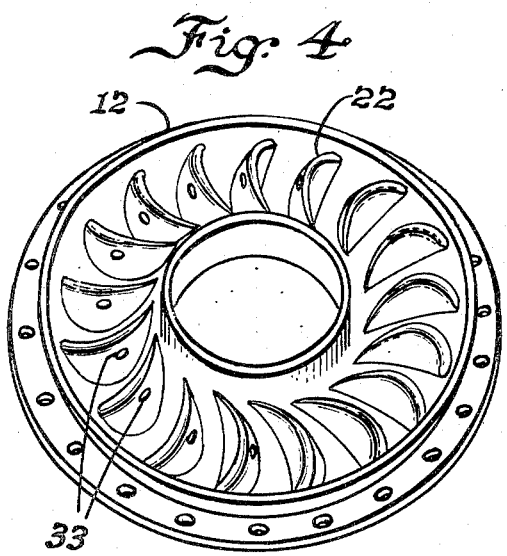
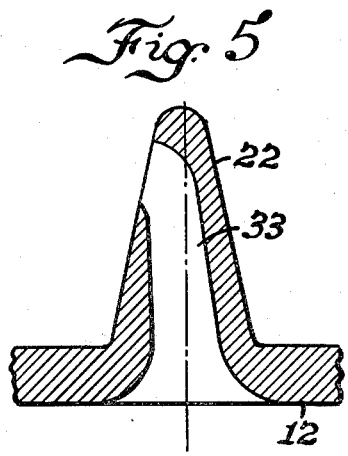

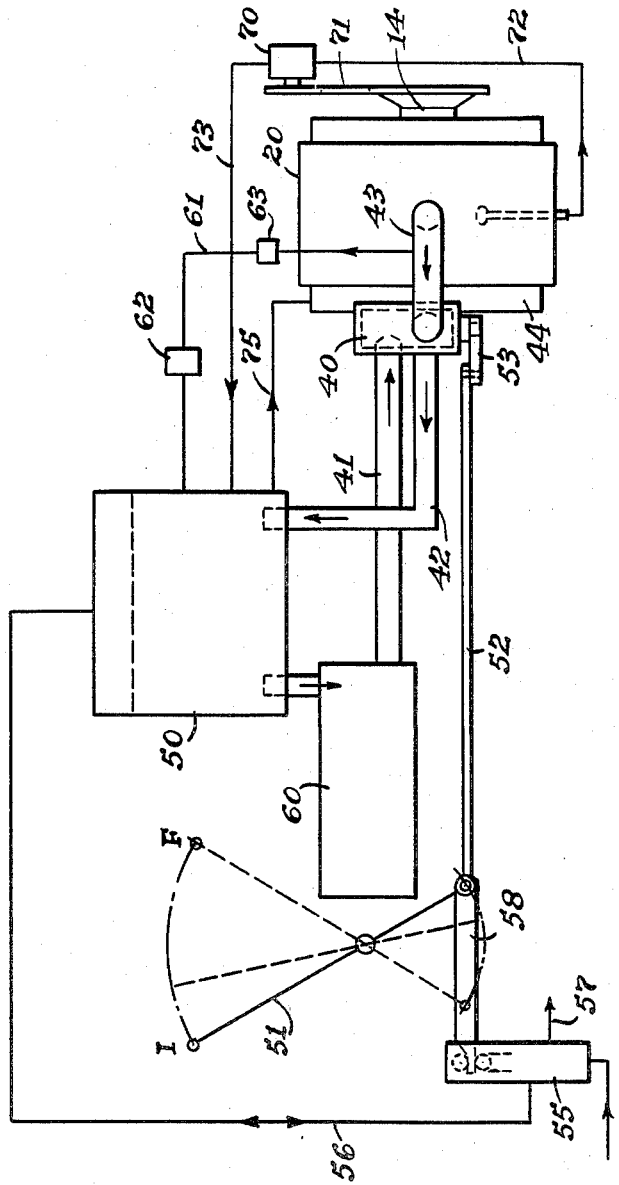

United States Patent Office
2,889,013
Patented June 2, 1959

2,889,013

HYDRAULIC TURBO BRAKES

Heinrich Schneider, Kittredge, Colo., assignor to Schneider Brothers Company, Muncie, Ind., a copartnership Application August 16, 1955, Serial No. 528,654

5 Claims. (Cl. 188—90)

This invention relates to hydraulic turbo brakes for general use, although the one herein disclosed is particularly designed and intended for use in automotive vehicles and locomotives.

The principal object of my invention is to provide a hydraulic turbo brake of high braking capacity in a small and light unit, and one that makes it easy to control the braking capacity by partial filling by use of a new type of buckets in the rotor and reactor.

Other objects of the invention are outlined in the following specification, in which reference is made to the accompanying drawings, wherein Fig. 1 is a cross-section of the brake of my invention, showing the lower one-half of the structure in elevation;

Fig. 2 is an end view of Fig. 1;

Fig. 3 is a perspective view of the rotor wheel;

Fig. 4 is a perspective view of the reactor member;

Fig. 5 is a cross-section of a reactor bucket, on a larger scale;

Fig. 6 is a cross-section of a rotor bucket, on the same scale as Fig. 5, and

Fig. 7 is a piping and control diagram.

Referring to Figs. 1 and 2, a hydraulic turbo brake of the two fluid circuit torus type is shown in cross-section, comprising a rotor consisting of two rotor wheels 11 of the impeller type rigidly mounted by means of a hub 13 splined on the brake shaft 14. The two rotors 11 are provided in housing 20, and two side covers for this housing form the stationary reactor members 12. The rotors 11 and reactors 12 form together the substantially circular fluid circuits, each rotor and each reactor covering substantially half a circuit arranged symmetrically from the radial center-line of said circuit and carrying coacting buckets, numbered 21 in the rotors and 22 in the reactors. Shaft 14 is mounted in the housing 20 by means of bearings 23, brackets 24, and reactors 12, the assembly including oil seals 25 in opposite ends of the housing. A centrifugal pump impeller 30 discharges the braking fluid into chamber 31, from which it enters the left brake circuit through channels 33 in the reactor bucket walls, as also appears in Fig. 5. A manifold 35 connects chamber 31 at the left to the intake chamber 36 for the right hand circuit in which the fluid enters through similar channels 33 in reactor bucket walls 22. A rotary valve 40 controls the intake and discharge of the braking fluid.

Fig. 7 shows the piping and control diagram. A fluid tank 50 contains the fluid for operating the brake in housing 20. When the inlet valve 40 is opened, the fluid flows from the tank 50 through the oil cooler 60 into the brake chamber 44 (Fig. 1) from which it flows into the impeller 30. The fluid is discharged from the brake through housing 20, pipe 43 and valve 40, returning through pipe 42 to tank 50. Valve 40 is a rotary valve having two control channels side by side, as clearly shown in Fig. 2, one for the inlet 41, and one for the outlet 42, and is operated by a lever 51, rod 52, and arm 53 attached to the rotor of valve 40. When the inlet 41 is closed, the outlet 42 is open, and, contrariwise, when the inlet 41 is fully open, the outlet 42 is fully closed. In positions between the end or limit positions, the inlet and outlet are partly open and the relative openings can be controlled by positioning lever 51.

To assist in and accelerate the filling of the brake with fluid, compressed air is used on top of the fluid in the tank 50. An air valve 55, to which is connected a suitable source of compressed air supply, is provided and is opened by means of a cam link 58 during the first part of the stroke of lever 51 while opening the fluid inlet valve 40 to the brake, thereby furnishing compressed air to tank 50 through pipe 56. While the inlet valve 40 is being closed fully, the air valve 55 closes and relieves pressure in tank 50 by allowing the air from tank 50 to exhaust through pipe 57.

When the brake is filled, partially or fully, the rotor buckets 21 throw the fluid outwardly, as the arcuate arrows on these parts in Fig. 1 indicate, and this fluid is thrown into the reactor and flows in buckets 22 inwardly as indicated by the arcuate arrows on these parts in Fig. 1 and is directed back into the rotor, repeating the circular motion. The torque to turn the rotor produces an equal braking torque in the reactor.

The concave side of the buckets 21 faces in the direction of rotation of the rotor 11, indicated by arrow R in Fig. 3, and the concave side of buckets 22 of reactor 12 faces in the opposite direction with respect to the direction of rotation, as seen in Fig. 4. Fig. 3 is a perspective view of the rotor 11 showing that the buckets 21 are each shaped as a segment of a hollow sphere, convex on one side and concave on the other side, and of arcuate form along the streamlines or paths of the vortex fluid flow, but are thin at the outer exit end portion and thick but rounded at the inner entrance end portion. Fig. 6 is a cross-section of the bucket wall 21, showing that the center-line of the wall is disposed substantially at right angles to the outer shroud of the rotor 11 and that the section is tapered toward the center of the fluid circle, to enable the use of a one-piece ring mold for the casting of said buckets, as for die-casting, or casting in green sand or plaster. Fig. 4 is a perspective view of reactor 12 showing that the buckets 22 are similar to those of the rotor 11, but are thick at the outer end and thin at the inner end. Fig. 5 is a cross-section of the bucket wall through the fluid inlet channel 33, which also appears in Fig. 4. The fluid therefore enters the circuit on the convex or back side of the bucket wall at a point of substantially lowest fluid pressure. This type of bucket facilitates operation at partial filling and also the control of the braking capacity. The bucket space area projected on a plane through the axis in the circuit half of the cross-section Fig. 1 is formed by two joining segments of a circle.

A gear pump 70 driven by means of a belt 71 from the brake shaft 14 (Fig. 17) circulates a small amount of fluid from the bottom 74 of the brake housing 20, the fluid being drawn to the pump from drain 74 through pipe 72 and discharged through pipe 73 into the tank 50. By means of a small pipe 75, a small amount of fluid, measured by an orifice, drains into the brake housing during idling, and gear pump 70, which has a capacity in excess of the drain volume, returns the fluid. During the idling of the brake, there is, therefore, a small amount of fluid circulated through the brake housing 20, thereby cooling the latter. The brake would otherwise heat up at high speed idling by reason of the blower action of the rotor. The gear pump may produce a partial vacuum to reduce heating up of the brake. A bypass 61 is provided connecting the brake discharge 43 directly with the tank 50, bypassing valve 40. The bypass line 61 includes in it a relief valve 62 and a check valve 63.

In operation, if control lever 51 is moved from idling position "I" to the right to full load position "F," valve 40 opens fully and lets the fluid enter the brake from tank 50 thru cooler 60 and inlet pipe 41 into chamber 44. At the same time, valve 40 closes the outlet from the brake to pipe 42. There is no difficulty on account of trapped air in the brake, because the fluid filling the brake enters the brake torus under pressure, either by reason of compressed air on the fluid in tank 50 or by reason of the centrifugal pump 30, so that air in the brake is compressed toward the center of the brake torus, close to shaft 14, where some of the air escapes through seals 25. Of course, some of the air is also discharged through pipe 42 and some may accumulate in chambers 31 and 36 and manifold 35. When the brake is completely filled, maximum fluid volume is circulated in the brake circuit by means of the rotating impeller 11. The power needed to rotate the impeller is equal to the brake absorption power and the higher the impeller speed the higher is the brake capacity. To reduce the power absorption of the brake, the control lever 51 is moved towards the left (the idling position "I") thereby partially opening the outlet and partially closing the inlet opening of valve 40, so that the brake operates with part filling. The farther control lever 51 is moved to the left the more the inlet opening of valve 40 is closed and the outlet opened and the filling of the brake with fluid is reduced, as more fluid is discharged than can enter the brake. The power absorbed in the brake is converted into heat, which is dissipated in the cooler 60. To provide fluid circulation through brake and cooler, even if the outlet opening of valve 40 is fully closed, the bypass valve 62 is provided, and it is of a type that closes under spring pressure and opens automatically more and more with increasing fluid back pressure. To empty the brake completely, control lever 51 is moved to position "I," so that the inlet opening of valve 40 is completely closed and the outlet opening fully opened. Then the fluid in the brake is discharged through pipe 43, valve 40, and pipe 42 into tank 50. When the brake is empty it absorbs no power except idling resistance, consisting of small losses in bearings, oil seals and impeller windage.

It is believed the foregoing description conveys a good understanding of the objects and advantages of my invention. The appended claims have been drawn to cover all legitimate modifications and adaptations.

I claim:

1. A hydraulic turbo brake comprising a rotor mounted rigidly on a shaft, a stationary housing including a stationary reactor, the rotor and reactor forming together a torus fluid circuit having a substantially circular outer shroud, said rotor and reactor each including substantially half of the circuit with the halves arranged symmetrically on opposite sides of a plane through the annular center-line of said circuit, each of said rotor and reactor carrying coacting buckets each shaped as a segment of a hollow sphere and being convex on one side and concave on the other side and of arcuate form along the paths of the vortex fluid flow, the concave side of the buckets of the rotor facing in the direction of rotation, the concave side of the buckets of the reactor facing in the opposite direction.

2. A brake as set forth in claim 1, wherein the cross-section of the wall of each of said buckets is tapered from a heavier section at the outer shroud of the fluid circuit to a thinner section near the vortex center of said fluid circuit.

3. A brake as set forth in claim 1 including a fluid tank, a cooler, a compressed air supply, piping for conducting compressed air from said supply to the fluid tank and to relieve said tank of air pressure, inlet piping connecting the brake with said tank through said cooler, discharge piping connecting said brake with said tank, control mechanism including inlet and outlet valves to circulate and control fluid circulation through said brake, cooler and fluid tank with the assistance of compressed air from said compressed air supply on top of the fluid in the tank, and an air valve controlling air flow to and from said fluid tank, said air valve being connected for operation with said control mechanism, whereby the air valve is opened and closed in the first portion of the opening of the inlet valve.

4. A brake as set forth in claim 1 including a fluid tank, a cooler, inlet piping connecting the brake with said tank through said cooler, discharge piping connecting said brake with said tank, and control mechanism to circulate and control fluid circulation through said brake, cooler and fluid tank, a positive displacement pump driven by the brake shaft which sucks fluid from the bottom of the brake housing and discharges it into the fluid tank, the inlet of said brake housing being restricted by means of a small pipe extending from the tank to the brake housing permitting circulation of a small amount of fluid through said housing during idling for cooling the brake, said pump having a capacity to pump more fluid than the small pipe is capable of delivering into the brake housing, whereby to produce a partial vacuum in the brake.

5. A hydraulic turbo brake comprising a rotor mounted rigidly on a shaft, a stationary housing including a stationary reactor, the rotor and reactor forming together a torus fluid circuit having a substantially circular outer shroud, said rotor and reactor each including substantially half of the circuit with the halves arranged symmetrically on opposite sides of a plane through the annular center-line of said circuit, each of said rotor and reactor carrying coacting buckets each shaped as a segment of a hollow sphere and being convex on one side and concave on the other side and of arcuate form along the streamlines, the concave side of the buckets of the rotor facing in the direction of rotation, the concave side of the buckets of the reactor facing in the opposite direction, the cross-section of each of said bucket walls being tapered from a heavier section at the outer shroud of the circuit to a thinner section close to the vortex center of said fluid circuit, the bucket wall being formed with a rounded entrance portion and thin exit portion and the thin short wall section close to the circuit center being substantially radial.

References Cited in the file of this patent

UNITED STATES PATENTS

| | | |
|---|---|---|
| 1,610,830 | Walker | Dec. 14, 1926 |
| 1,985,889 | De La Mater et al. | Jan. 1, 1935 |
| 2,170,128 | De La Mater | Aug. 22, 1939 |
| 2,388,112 | Black | Oct. 30, 1945 |
| 2,634,830 | Cline | Apr. 14, 1953 |
| 2,715,876 | Schneider | Aug. 23, 1955 |
| 2,750,009 | Pohl | June 12, 1956 |
| 2,768,711 | Cline | Oct. 30, 1956 |

FOREIGN PATENTS

| | | |
|---|---|---|
| 722,476 | Great Britain | Jan. 26, 1955 |